Feb. 4, 1941. L. L. SALFISBERG 2,230,849
CRIMPED PACKAGE
Filed March 5, 1938
FIG_1
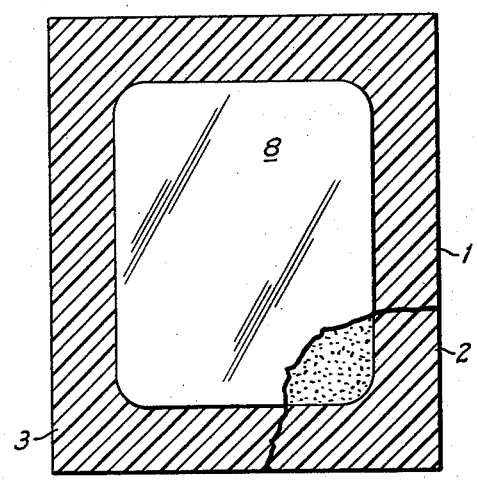
FIG_2
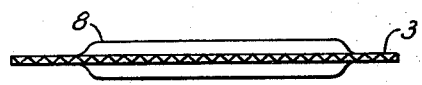
FIG_3
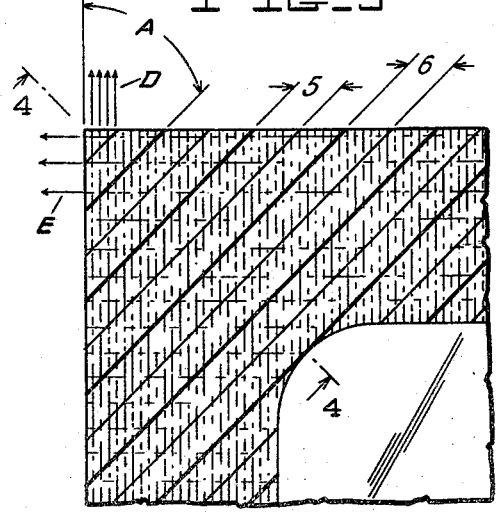
FIG_4
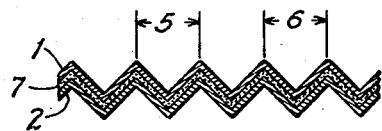
INVENTOR
Leroy L. Salfisberg
BY Gordon B Scheidell
ATTORNEY Patented Feb. 4, 1941

2,230,849

UNITED STATES PATENT OFFICE 2,230,849

CRIMPED PACKAGE

Leroy L. Salfisberg, South Orange, N. J., assignor to Ivers-Lee Company, Newark, N. J., a corporation of Delaware Application March 5, 1938, Serial No. 194,018

1 Claim. (Cl. 206—46)

This invention pertains in general to the art of packaging, and specifically to a construction of seal for joining together two layers of packaging material in the formation of a package or container structure.

The principal object of the invention comprises providing a special form of interdigitated seal for layers of packaging material.

A further object of the invention comprises providing a container structure composed of layers of packaging material joined by a form of crimping angularly disposed with respect to the fibrous content of the layers of material.

These and other objects will be apparent from the following, reference being had to the accompanying drawing in which like reference numerals designate corresponding parts and in which:

Fig. 1 is an elevational view of one embodiment of a package or container constructed in accordance with the principles of the invention;

Fig. 2 is an end view of the unit depicted in Fig. 1;

Fig. 3 is an enlarged fragmentary view of a corner of the structure shown in Fig. 1; and Fig. 4 is a sectional view taken along the line 4—4 of Fig. 3.

This invention is principally concerned with the provision of seals in packaging material in the formation of package and container structures. I have discovered that in the use of transparent thermoplastically coated paper, Cellophane, and like materials, having a directed fiber-like structure in which the fiber formations lie predominantly in a definite direction, that seals between opposed layers of such material become much more efficient when produced by interdigitated crimps angularly disposed with respect to the direction of the fibrous structure.

This feature is especially advantageous in utilizing a seal to enclose a commodity, where it is desired to hermetically seal the commodity. Referring to Fig. 1, opposed layers of transparent packaging material 1 and 2, composed of heat sealable Cellophane, or the like, are joined together at their edge portions by an encircling flange 3 in the area of which the layers of material are provided with interdigitated crimps angularly disposed with respect to the principal direction "D" of the fibers of the material, as shown in Fig. 3.

Referring to Fig. 3, it will be seen that most of the fibers lie in the direction "D" with occasional cross fibers in the direction "E."

The crimps such as represented at 5 and 6 are disposed on a bias "A" which, in the present instance, is at an angle of 45° with respect to the principal direction of the fibers of the material. The mechanical interdigitation of the layers 1 and 2 to produce the diagonal or biased ridgelike crimping, is effected by the use of mechanically complementary dies, heated sufficiently to fuse the thermoplastic coating of the packaging material being sealed. Due to the unusual effectiveness of the diagonal crimps, the surrounding flange 3 produces a completely sealed inner envelope commodity receptacle or pocket 8. The crimp-sealed zones, i. e., the perimetral flange 3, form the margins of and surround the pocket 8, and the crimps or corrugations extend across the flange 3 obliquely outwardly with respect to said margins of the pocket and the edges of the layers 1 and 2. The inner ends of certain of the corrugations are disposed in the respective margins of the pocket, while other corrugations are disposed obliquely of the flange beyond the corners of the pocket. As before pointed out, various types of materials may be used, and as will be seen in Fig. 4, the walls 1 and 2 include the inner fused thermo-plastic material 7.

In accordance with the scope of the invention, the fibers of the material of layers 1 and 2 may be distinct fiber elements, as in papers, etc., or may be fiber-like molecular arrangements in the material such as may be induced by directed strains. Thus viscose materials, or metals, may be formed with such directed molecular arrangements so that the material has a fiber-like characteristic. For example, by a slow, gradual longitudinal tension, a directed strain may be induced in a ribbon of metal or the like to impart thereto a molecular arrangement simulating a fiber-like construction. Therefore, it will be seen that the use of the term "fiber" herein is intended to embrace all such characteristics of the material used.

As shown, the crimpings 5 and 6 are in the form of corrugations, specifically parallel, adjoining, alternately arranged ridges and grooves which extend lengthwise obliquely with respect to the margins of the pocket 8 and the fibers of the layers. Those corrugations produce a seal of great strength which is uniform throughout the flange 3, that is, the seal has uniform resistance to separation of the layers 1 and 2 and to tearing of the layers longitudinally and transversely of the package. Furthermore, the diagonal or oblique corrugations provide tight seals or closures of the corners of the pocket due to the uniformity and continuity of the corrugations. Another advantage of the diagonal or oblique corrugations is that during the crimping operation the over-all dimensions of the flange 3 in the directions of the respective sides of the pocket 8 are shortened uniformly at all sides of the pocket, and there is no tendency to relative changes in dimensions of the margins of the pocket or buckling of the material along any margins of the pocket. Thus, even without taking into consideration the fibrous nature of packaging material, the type of crimping construction possesses definite mechanical advantages over other types of crimping heretofore used in such types of packages. This is especially true from the standpoint of construction of the crimping dies for forming the package, as it is found that the present type of crimp makes it possible to produce an efficient and uniform seal with dies of simple construction.

Although a preferred form of crimped package seal has been disclosed, it will be recognized that various equivalent forms will occur to those skilled in the art without departing from the intended scope of the invention. Therefore, no limitation is intended except as pointed out in the appended claim.

What is claimed as new and original to be secured by Letters Patent of the United States is:

A package comprising superposed rectangular layers of material having their edge portions sealed together in a continuous perimetral flange forming the margins of and surrounding a pocket between the layers, the layers in said flange being crimped together by corrugations that extend across the flange obliquely with respect to said margins of the pocket and the edges of the layers, all of the ridges and grooves of the corrugations throughout the flange forming the respective margins of the pocket being parallel, the inner ends of certain of said corrugations being disposed substantially in the respective said margins and other corrugations being disposed obliquely of the flange beyond the pocket.

LEROY L. SALFISBERG.